(12) United States Patent
Ido et al.

(10) Patent No.: US 11,881,800 B2
(45) Date of Patent: Jan. 23, 2024

(54) CONTROL APPARATUS FOR ELECTRIC MOTOR-DRIVEN HOISTING-LOWERING DEVICE

(71) Applicant: KITO CORPORATION, Yamanashi (JP)

(72) Inventors: Yusaku Ido, Yamanashi (JP); Tadashi Yamano, Yamanashi (JP); Takuma Isshiki, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 145 days.

(21) Appl. No.: 17/776,883

(22) PCT Filed: Oct. 21, 2020

(86) PCT No.: PCT/JP2020/039631
§ 371 (c)(1),
(2) Date: May 13, 2022

(87) PCT Pub. No.: WO2021/100397
PCT Pub. Date: May 27, 2021

(65) Prior Publication Data
US 2022/0407445 A1    Dec. 22, 2022

(30) Foreign Application Priority Data

Nov. 19, 2019  (JP) .................................. 2019-208954

(51) Int. Cl.
*H02P 25/16*        (2006.01)
*B66D 1/46*         (2006.01)
(Continued)

(52) U.S. Cl.
CPC ................ *H02P 25/16* (2013.01); *B66D 1/46* (2013.01); *H02M 1/08* (2013.01); *H02M 7/06* (2013.01)

(58) Field of Classification Search
CPC ............ H02P 25/16; H02M 1/08; H02M 7/06
See application file for complete search history.

(56) References Cited

U.S. PATENT DOCUMENTS 4,024,443 A * 5/1977 Schmucker ............. H02P 25/03
                                                    318/721
5,055,989 A * 10/1991 Carroll ................ H02M 7/4807
                                                     363/36
(Continued)

FOREIGN PATENT DOCUMENTS

CN          202218190 U      5/2012
JP          6-165588 A       6/1994
(Continued)

OTHER PUBLICATIONS

International Search Report dated Dec. 28, 2020, issued in counterpart International Application No. PCT/JP2020/039631, w/English Translation. (5 pages).

*Primary Examiner* — Rina I Duda
(74) *Attorney, Agent, or Firm* — WHDA, LLP

(57) ABSTRACT

To achieve a size reduction by on-off controlling non-contact switching devices with a microcomputer. When a three-phase alternating-current electric motor is to be used, lead wires of the three-phase alternating-current electric motor are connected to output terminals of a control board. When a single-phase alternating-current electric motor is to be used, two supply terminals of the control board are electrically connected together through a first connecting member, and one end of the first connecting member is defined as a single-phase alternating-current power supply terminal. A second connecting member is connected to a supply terminal, and one end of the second connecting member is defined as a single-phase alternating-current power supply terminal. A main winding of the single-phase alternating-current electric motor is connected to the output (Continued)

terminals, and an auxiliary winding is connected to the output terminal and the second connecting member.

7 Claims, 7 Drawing Sheets

(51) Int. Cl.
*H02M 1/08* (2006.01)
*H02M 7/06* (2006.01)

(56) References Cited

U.S. PATENT DOCUMENTS

| | | | |
|---|---|---|---|
| 5,311,419 A * | 5/1994 | Shires | H02M 7/25 |
| | | | 363/129 |
| 2015/0333689 A1* | 11/2015 | Kudoh | H02P 27/16 |
| | | | 363/148 |

FOREIGN PATENT DOCUMENTS

| JP | 8-317690 A | 11/1996 |
|---|---|---|
| JP | 9-191681 A | 7/1997 |
| JP | 2002-262595 A | 9/2002 |

* cited by examiner

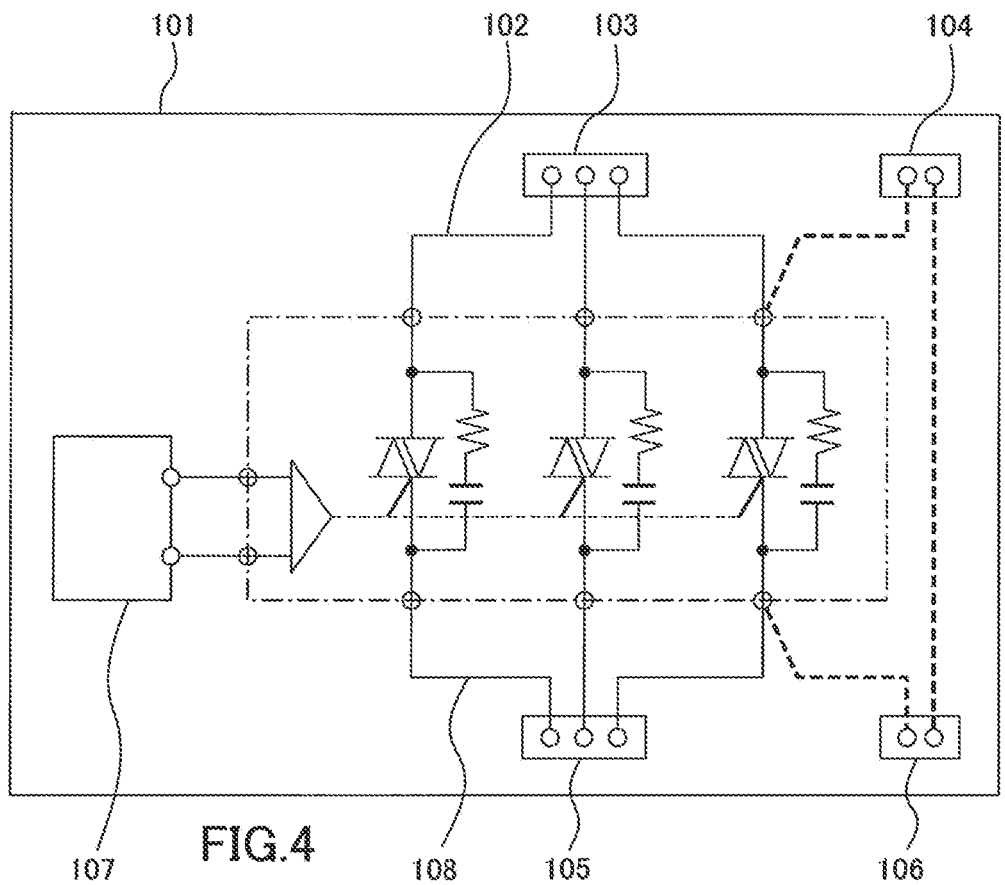
FIG.4
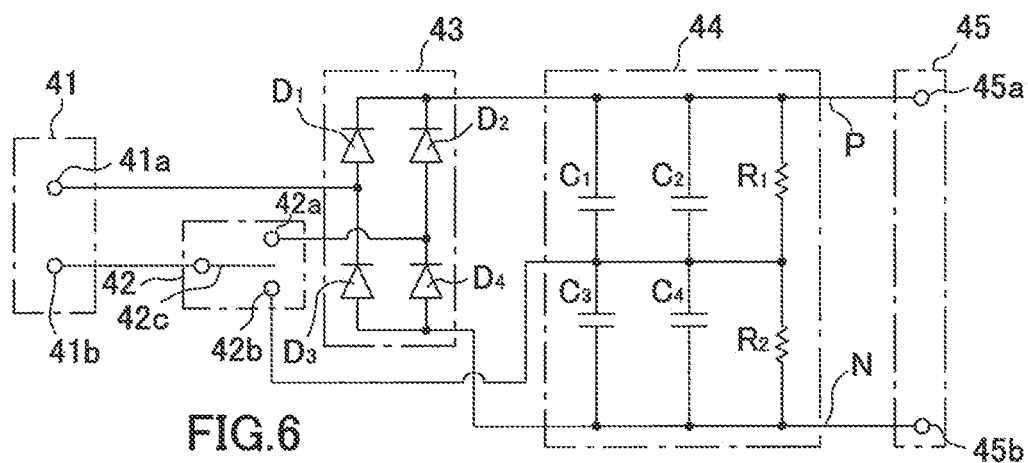
FIG.5
FIG.6

CONTROL APPARATUS FOR ELECTRIC MOTOR-DRIVEN HOISTING-LOWERING DEVICE

TECHNICAL FIELD

The present invention relates to a control apparatus for an electric motor-driven hoisting-lowering device such as a chain block, a rope hoist, etc., which hoists and lowers (hereinafter occasionally described as "hoisting-lowering") a heavy object (hereinafter referred to as a "load").

BACKGROUND ART

Many of the conventional electric motor-driven hoisting-lowering devices are classified into those using a three-phase alternating-current electric motor as an electric motor for hoisting and lowering (lifting up and down) a load and those using a single-phase alternating-current electric motor as such an electric motor. The two different types of electric motor-driven hoisting-lowering devices use control boards having different configurations from each other to constitute control apparatuses for the electric motor-driven hoisting-lowering devices. Thus, the conventional electric motor-driven hoisting-lowering device control apparatus uses a control board having a different configuration depending on whether the load hoisting-lowering electric motor is a three-phase electric motor or a single-phase electric motor, and therefore needs to prepare a control board having a different configuration depending on whether the electric motor is a three-phase electric motor or a single-phase electric motor, resulting in an increase in cost. Further, the conventional electric motor-driven hoisting-lowering device control apparatus suffers from a problem that it is necessary to prepare a control power supply circuit having a different configuration according to the difference in power supply voltage.

Under these circumstances, Patent Literature 1 discloses an apparatus (air conditioning apparatus) using a single-phase alternating-current electric motor or a three-phase alternating-current electric motor as an electric motor, the apparatus using a phase controllable control board which is compatible with single-phase and three-phase alternating-current electric motors, thereby allowing either a single-phase or three-phase alternating-current electric motor to be connected to the control board. The disclosed apparatus has a configuration in which, as shown in FIG. 4, a control board 101 has arranged thereon a three-phase solid-state relay 102, a three-phase power supply input connector 103, a single-phase power supply input connector 104, a three-phase power supply output connector 105, a single-phase power supply output connector 106, and an IC circuit 107, and these components are connected to each other by pattern wiring 108.

CITATION LIST

Patent Literature

Patent Literature 1: Japanese Patent Application Publication No. Hei 08-317690

SUMMARY OF INVENTION

Technical Problem

The above-described apparatus disclosed in Patent Literature 1 uses only the current path of one phase of the three phase current paths of the three-phase solid-state relay 102 to drive the single-phase alternating-current electric motor and is not configured to use all the three current paths of the three-phase solid-state relay for forward rotation, other than the current path thereof for reverse rotation, to drive the single-phase alternating-current motor. Therefore, when a single-phase alternating-current electric motor is used, a heavy load is undesirably applied to a part of non-contact switching devices of the three-phase solid-state relay. Further, the apparatus disclosed in Patent Literature 1 is not a technique taking into account the forward and reverse rotation of an alternating-current electric motor and therefore cannot be used in a device frequently performing a load hoisting-lowering operation like the electric motor-driven hoisting-lowering device, i.e. a device frequently performing the forward-reverse operation of an alternating-current electric motor to hoist and lower a load.

The present invention has been made in view of the above-described circumstances. An object of the present invention is to provide an electric motor-driven hoisting-lowering device control apparatus compatible with a three-phase alternating-current electric motor and a single-phase alternating-current electric motor without modifying a control board itself. That is, when a three-phase alternating-current electric motor is to be used as a load hoisting-lowering electric motor, the three-phase alternating-current electric motor can be connected to the output side of the control board simply by connecting the former to the latter, and when a single-phase alternating-current electric motor is to be used as the load hoisting-lowering electric motor, the single-phase alternating-current electric motor can be connected to the output side of the control board simply by using simple connecting members for the control board.

Solution to Problem

To solve the above-described problem, the present invention provides an electric motor-driven hoisting-lowering device control apparatus including a control board (20) having mounted thereon non-contact switching devices (21-1 to 21-5) and a microcomputer (23) performing on-off control of the non-contact switching devices. The control board (20) has three supply terminals (Rt, St, Tt) on an input side thereof and three output terminals (Ut, Vt, Wt) on an output side thereof in correspondence to the supply terminals (Rt, St, Tt), respectively. When a three-phase alternating-current electric motor (10) is to be used, a three-phase alternating-current power supply (100) is connected to the supply terminals (Rt, St, Tt), and the three-phase alternating-current electric motor (10) is connected to the output terminals (Ut, Vt, Wt). An alternating current to be supplied to the three-phase alternating-current electric motor (10) is controlled by controlling the non-contact switching devices (21-1 to 21-5) with the microcomputer (23). When a single-phase alternating-current electric motor (50) is to be used, two supply terminals (Rt, St) of the three supply terminals (Rt, St, Tt) of the control board (20) are electrically connected together through a first connecting member (61) to form a single-phase alternating-current power supply terminal (SP1) to which is connected one terminal of a single-phase alternating-current power supply (200). A second connecting member (62) is connected to the remaining supply terminal (Tt) to form a single-phase alternating-current power supply terminal (SP2) to which is connected the other terminal of the single-phase alternating-current power supply. The single-phase alternating-current power supply (200) is connected between the single-phase alternating-current power supply terminals (SP1, SP2). A main winding current path is formed so that an alternating current output from one output terminal (Ut) of the output terminals (Ut, Vt) corresponding to the supply terminals (Rt, St) electrically connected together and the output terminal (Wt) corresponding to the remaining supply terminal (Tt) passes through a main winding (51) of the single-phase alternating-current electric motor (50). An auxiliary winding current path is formed so that an alternating current output from the other output terminal (Vt) and the second connecting member (62) passes through an auxiliary winding (52) of the single-phase alternating-current electric motor (50). The alternating currents to be supplied to the main winding (51) and the auxiliary winding (52) are controlled by controlling the non-contact switching devices (21-1 to 21-5) with the microcomputer (23).

In addition, the present invention is characterized as follows. In the above-described electric motor-driven hoisting-lowering device control apparatus, when the three-phase alternating-current electric motor (10) is used, switching between forward and reverse rotation of the three-phase alternating-current electric motor (10) is performed by interchanging two phases of the three-phase alternating current through on-off control of the non-contact switching devices (21-1 to 21-5), and when the single-phase alternating-current electric motor (50) is used, switching between forward and reverse rotation of the single-phase alternating-current electric motor (50) is performed by performing switching such that the phase of the main current flowing through the main winding (51) of the single-phase alternating-current electric motor (50) is reversed 180 degrees when rotation is switched between forward and reverse through on-off control of the non-contact switching devices (21-1 to 21-5). It should be noted that the phase of auxiliary electric current flowing through the auxiliary winding (52) is not changed even when rotation is switched between forward and reverse.

In addition, the present invention is characterized as follows. In the above-described electric motor-driven hoisting-lowering device control apparatus, the main winding current path comprises the main winding (51), the input side of a full-wave rectification circuit (26), and an operating coil (63c) of the motor start relay (63), which are connected in series, and further comprises an exciting coil (27a) of an electromagnetic brake (27) connected to the output side of the full-wave rectification circuit (26). The auxiliary winding current path comprises the auxiliary winding (52), a phase-advancing capacitor (65), and contacts (63a, 63b) of the motor start relay (63), which are connected in series, so that the auxiliary winding current path can be on-off controlled by the motor start relay (63).

In addition, the present invention is characterized as follows. In the above-described electric motor-driven hoisting-lowering device control apparatus, the main winding current path comprises the main winding (51) and the input side of the full-wave rectification circuit (26), which are connected in series, and further comprises the exciting coil (27a) of the electromagnetic brake (27) connected to the output side of the full-wave rectification circuit (26). The auxiliary winding current path comprises the auxiliary winding (52) and the phase-advancing capacitor (65), which are connected in series, so that the electric current flowing through the auxiliary winding current path can be cut off by on-off controlling the non-contact switching device (21-2) with the microcomputer (23) according to the magnitude of electric current flowing through the main winding current path of the single-phase alternating-current electric motor.

In addition, the present invention is characterized as follows. In the above-described electric motor-driven hoisting-lowering device control apparatus, two pattern wirings (22-2, 22-3) of pattern wirings (22-1, 22-2, 22-3) connected to the supply terminals (Rt, St, Tt), respectively, are provided with current sensors (28S, 28T) having different measuring ranges, respectively.

In addition, the present invention is characterized as follows. In the above-described electric motor-driven hoisting-lowering device control apparatus, a pattern wiring (22-3) for supplying an electric current to the main winding (51) of the single-phase alternating-current electric motor (50) is provided with a current sensor (28T) having a large measuring range, and a pattern wiring (22-2) for supplying an electric current to the auxiliary winding (52) of the single-phase alternating-current electric motor (50) is provided with a current sensor (28S) having a small measuring range.

In addition, the present invention is characterized as follows. The above-described electric motor-driven hoisting-lowering device control apparatus is provided with a control power supply circuit (24) including a single-phase voltage doubler circuit (40) supplied as an input with an interphase voltage between two phases of the three-phase alternating-current power supply (100) connected to the supply terminals (Rt, St, Tt) or a single-phase voltage of the single-phase alternating-current power supply (200) connected to the single-phase alternating-current power supply terminals (SP1, SP2). The single-phase voltage doubler circuit (40) is configured such that when the single-phase voltage is input thereto, the single-phase voltage doubler circuit (40) doubles the input voltage, thereby making the input voltage equal to the interphase voltage between the two phases of the three-phase alternating-current power supply, and thus making a control circuit block (25) including the microcomputer (23) and the control power supply circuit (24) compatible with three-phase and single-phase applications.

Advantages of Invention

According to the present invention, when the three-phase alternating-current electric motor (10) is to be used as a load hoisting-lowering electric motor, lead wires (11-1 to 11-3) of the various phase windings of the three-phase alternating-current electric motor (10) are simply connected to the output terminals (Ut, Vt, Wt) of the control board (20). When the single-phase alternating-current electric motor (50) is to be used, a lead wire (66-1) of the main winding (51) of the single-phase alternating-current electric motor and a lead wire (66-3) of the auxiliary winding (52) thereof are simply connected to two output terminals (Ut, Vt) of the control board (20). Accordingly, it is possible to provide at low cost the control board (20), which is a main component of an electric motor-driven hoisting-lowering device control apparatus capable of using the three-phase alternating-current electric motor (10) and the single-phase alternating-current electric motor (50), and the electric motor-driven hoisting-lowering device control apparatus itself can also be provided at low cost because the electric motor-driven hoisting-lowering device control apparatus is constructed by using the low-cost control board (20) as a main component.

Further, an electric motor-driven hoisting-lowering device control apparatus using the single-phase alternating-current electric motor (50) can be constructed simply by adding the first connecting member (61) and the second connecting member (62) to the control board (20). Therefore, the electric motor-driven hoisting-lowering device control apparatus using the single-phase alternating-current electric motor (50) can be provided at low cost.

Further, when the three-phase alternating-current electric motor is used, switching between forward and reverse rotation can be performed by interchanging two phases through on-off control of the non-contact switching devices (21-1 to 21-5) disposed between the supply terminals (Rt, St, Tt) on the input side of the control board (20) and the output terminals (Ut, Vt, Wt) on the output side of the control board (20), and when the single-phase alternating-current electric motor is used, switching between forward and reverse rotation can be performed by performing switching such that the phase of electric current flowing through the main winding is reversed 180 degrees (phase is shifted 180 degrees) through on-off control of the above-described non-contact switching devices (21-1 to 21-5). Accordingly, the forward-reverse rotation switching control can be carried out simply by on-off controlling the non-contact switching devices.

Further, when either the three-phase alternating-current electric motor (10) or the single-phase alternating-current electric motor (50) is used as a load hoisting-lowering electric motor, the current paths including the non-contact switching devices (21-1 to 21-5) are used substantially uniformly; therefore, it is possible to extend the life of the non-contact switching devices, etc.

Further, the non-contact switching device (21-2) is turned off when the electric current flowing through the main winding (51) reaches a predetermined value after the start of a load hoisting or lowering operation of the single-phase alternating-current electric motor (50) or after a predetermined time has elapsed (e.g. at timing when the rotation becomes stable) to stop the electric current flowing through the auxiliary winding (52) thereafter, thereby eliminating electric power consumed by the auxiliary winding (52), etc., and thus achieving energy conservation. Further, because energy conservation can be achieved without need of a motor start relay by turning off the non-contact switching device (21-2), the cost can be reduced by an amount corresponding to the cost of the motor start relay otherwise needed.

Further, the control board (20), which is a main component of the electric motor-driven hoisting-lowering device control apparatus capable of using the three-phase alternating-current electric motor (10) and the single-phase alternating-current electric motor (50), has a current sensor (28T) with a large measuring range provided on the pattern wiring (22-3) for supplying an electric current to the main winding (51) of the single-phase alternating-current electric motor (50) and further has a current sensor (28S) with a small measuring range provided on the pattern wiring (22-2) for supplying an electric current to the auxiliary winding (52) of the single-phase alternating-current electric motor (50), so that when the three-phase alternating-current electric motor is to be controlled (FIG. 8), electric power is calculated based mainly on the result of measurement by the current sensor (28S) with a small measuring range, which is suitable for measuring the electric current of the three-phase alternating-current electric motor, and when the single-phase alternating-current electric motor is to be controlled (FIG. 9), electric power is calculated based mainly on the result of measurement by the current sensor (28T) with a large measuring range, which is suitable for measuring the electric current of the single-phase alternating-current electric motor. Therefore, it is possible to improve the accuracy of detecting the motor load based on the electric power calculation result, and a detection circuit for detecting electric current and electric power can be made compatible with a three-phase alternating-current electric motor having a small rated current (e.g. voltage: 460V) and a single-phase alternating-current electric motor having a large rated current (e.g. voltage: 100V).

Further, according to the present invention, the control power supply circuit (24) is provided with a single-phase voltage doubler circuit (40) that doubles the single-phase voltage, thereby enabling the control circuit block (25) including the microcomputer (23) and the control power supply circuit (24) to be compatible with a plurality of single-phase power supplies different in single-phase voltage from each other, and thus making it possible to significantly reduce the number of manufactured models thereof.

BRIEF DESCRIPTION OF DRAWINGS

FIG. 4 is a diagram showing a circuit configuration of an air conditioning apparatus disclosed in the above-described Patent Literature 1.

FIG. 5 is a diagram for explaining a technique of making a control circuit block compatible with three-phase and single-phase applications by using a single-phase voltage doubler.

FIG. 6 is a diagram showing a configuration example of a voltage doubler circuit.

DESCRIPTION OF EMBODIMENTS

Figure 1:
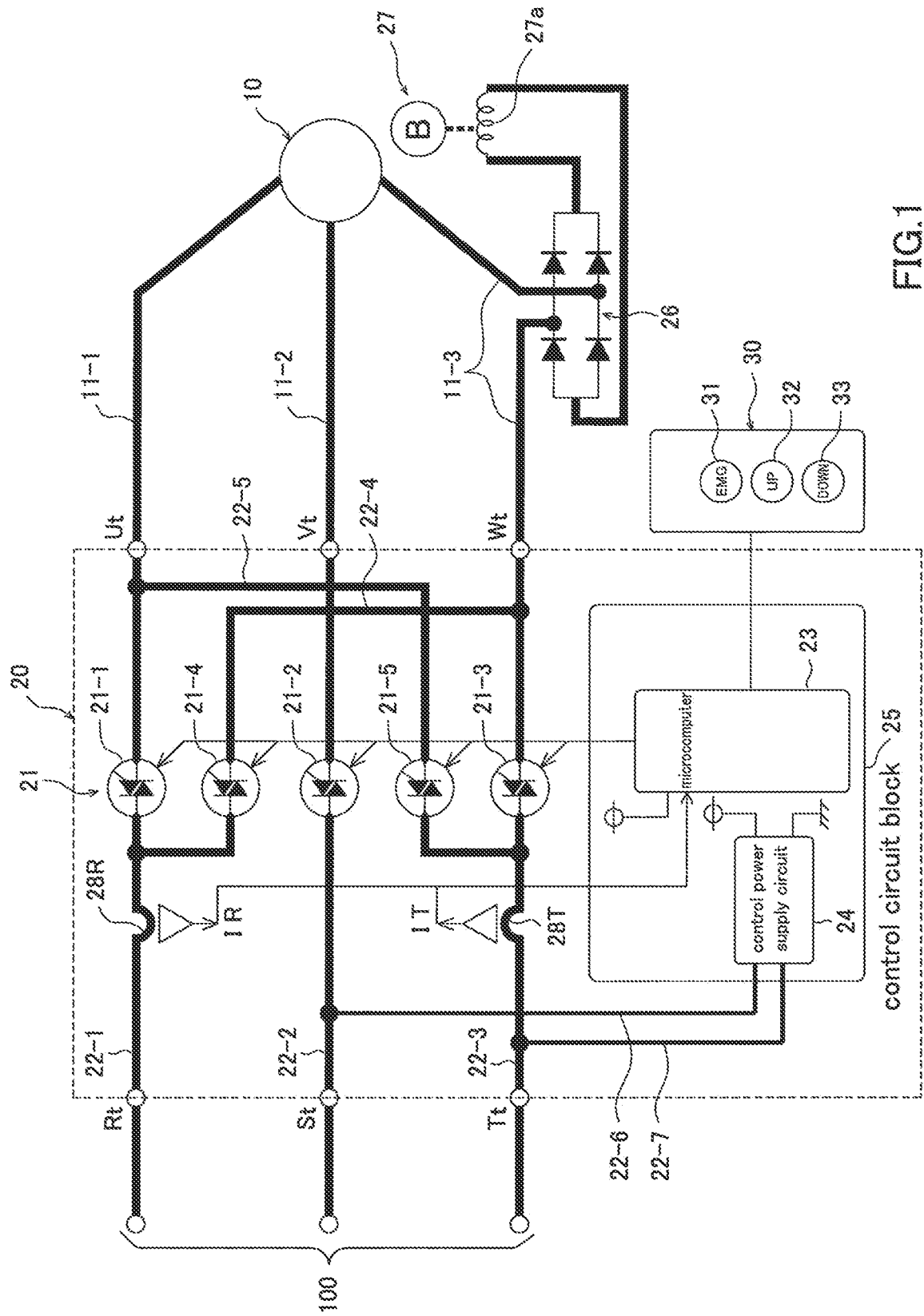
FIG. 1 is a diagram showing a configuration example in which a three-phase alternating-current electric motor is connected to an output part of an electric motor-driven hoisting-lowering device control apparatus according to the present invention.

An embodiment of the present invention will be explained below in detail. FIG. 1 is a diagram showing a basic general configuration example of an electric motor-driven hoisting-lowering device control apparatus according to the present invention. Let us here explain an example in which a three-phase alternating-current electric motor (three-phase induction electric motor in this example) 10 is used as an electric motor of an electric motor-driven hoisting-lowering device to hoist and lower (lift up and down) a load. The electric motor-driven hoisting-lowering device control apparatus includes a control board 20 having five non-contact switching devices 21-1 to 21-5 mounted thereon to constitute a three-phase non-contact device (solid-state relay SSR) 21. Here, the non-contact switching devices 21-1 to 21-3 are devices for rotating the three-phase alternating-current electric motor 10 in forward direction, i.e. in a direction for hoisting (lifting up) the load, and the non-contact switching devices 21-4, 21-2 and 21-5 (e.g. triacs, which are semiconductor switches) are devices for rotating the three-phase alternating-current electric motor 10 in reverse direction, i.e. in a direction for lowering (lifting down) the load.

Further, the control board 20 is provided on an input side thereof with three supply terminals Rt, St and Tt for supplying a three-phase alternating current from a three-phase alternating-current power supply 100 and further provided with three output terminals Ut, Vt and Wt for outputting to the three-phase alternating-current electric motor 10 a three-phase alternating current controlled by the control board 20. The non-contact switching device 21-1 is disposed between the supply terminal Rt and the output terminal Ut through a pattern wiring 22-1. The non-contact switching device 21-2 is disposed between the supply terminal St and the output terminal Vt through a pattern wiring 22-2. The non-contact switching device 21-3 is disposed between the supply terminal Tt and the output terminal Wt through a pattern wiring 22-3. The non-contact switching devices 21-1, 21-2 and 21-3 form the following three current paths, respectively, for supplying the three-phase alternating-current electric motor 10 with a three-phase alternating current generating a rotating magnetic field for rotating a rotor (not shown) of the three-phase alternating-current electric motor 10 in forward direction.

The non-contact switching device 21-4 is disposed between the supply terminal Rt and the output terminal Wt through a pattern wiring 22-4, and the non-contact switching device 21-5 is disposed between the supply terminal Tt and the output terminal Ut through a pattern wiring 22-5. The combination of the non-contact switching device 21-4 and the pattern wiring 22-4, the combination of the non-contact switching device 21-5 and the pattern wiring 22-5, and the combination of the non-contact switching device 21-2 and the pattern wiring 22-2 form the following three current paths, respectively, for supplying the three-phase alternating-current electric motor 10 with a three-phase alternating current generating a rotating magnetic field for rotating the rotor of the three-phase alternating-current electric motor 10 in reverse direction.

Further, between the supply terminal Rt and the non-contact switching device 21-1 is disposed a current sensor (Hall IC) 28R for detecting an R-phase current supplied to a winding of the three-phase alternating-current electric motor 10 through the pattern wiring 22-1. Between the supply terminal Tt and the non-contact switching device 21-3 is disposed a current sensor (Hall IC) 28T for detecting a T-phase current supplied to a winding of the three-phase alternating-current electric motor 10 through the pattern wiring 22-3. Further, as shown in the figure, the current sensor 28R is disposed at a position capable of also detecting an electric current passing through the non-contact switching device 21-4, and the current sensor 28T is disposed at a position capable of also detecting an electric current flowing through the non-contact switching device 21-5.

Further, the control board 20 has mounted thereon a control circuit block 25 including a microcomputer 23 and a control power supply circuit 24. The control power supply circuit 24 is supplied as an input with an alternating-current voltage (interphase voltage) input between the phases of the supply terminal St and the supply terminal Tt through pattern wirings 22-6 and 22-7. Further, detection currents IR and IT detected by the current sensors 28R and 28T are input to the microcomputer 23. Lead wires 11-1 and 11-2 connected to the windings of two phases of the three phases of the stator of the three-phase alternating-current electric motor 10 are connected to the output terminals Ut and Vt, respectively, of the control board 20, and a lead wire 11-3 connected to the winding of the remaining phase of the stator of the three-phase alternating-current electric motor 10 is connected to the output terminal Wt of the control board 20 through a full-wave rectification circuit 26.

Reference numeral 27 denotes an electromagnetic brake. The electromagnetic brake 27 has an exciting coil 27a connected to the output end of the full-wave rectification circuit 26. An alternating current from the output terminal Wt of the control board 20 is converted into a direct current through the full-wave rectification circuit 26 and supplied to the exciting coil 27a as a brake current. Consequently, the electromagnetic brake 27 is released, and the rotor of the three-phase alternating-current electric motor 10 becomes unrestrained. Usually, the three-phase alternating-current electric motor 10 often has the full-wave rectification circuit 26, the electromagnetic brake 27, the lead wires 11-1 to 11-3, etc. incorporated into a single product after being mechanically and electrically adjusted so that the components perform their functions and so forth. When the three-phase alternating-current electric motor 10 prepared as a single product is used as a load hoisting-lowering electric motor, an electric motor-driven hoisting-lowering device control apparatus can be constructed simply by mechanically assembling the three-phase alternating-current electric motor 10 into the apparatus and thereafter connecting the lead wires 11-1, 11-2 and 11-3 of the three-phase alternating-current electric motor 10 to the output terminals Ut, Vt and Wt, respectively, of the control board 20.

Reference numeral 30 denotes an operation unit of the electric motor-driven hoisting-lowering device control apparatus. The operation unit 30 has an emergency pushbutton switch 31, a hoisting pushbutton switch 32, a lowering pushbutton switch 33, etc. When the hoisting pushbutton switch 32, for example, of the operation unit 30 is pressed in a state where the three-phase alternating-current power supply (commercial three-phase power supply) 100 is turned on to supply electric power through the supply terminals Rt, St and Tt of the control board 20, a hoisting signal is output to the microcomputer 23, and the non-contact switching devices 21-1, 21-2 and 21-3 of the three-phase non-contact device (solid-state relay SSR) 21 are on-controlled by processing with the microcomputer 23, so that the stator windings of the three-phase alternating-current electric motor 10 are each supplied with a three-phase electric current generating a rotating magnetic field for rotating the rotor of the three-phase alternating-current electric motor 10 in the load hoisting direction. At the same time, the exciting coil 27a of the electromagnetic brake 27 is supplied with a brake current through the full-wave rectification circuit 26 to release the electromagnetic brake 27. Consequently, the rotor of the three-phase alternating-current electric motor 10 rotates in the load hoisting direction to hoist (lift up) the load.

When the load reaches a predetermined position, the pressing of the hoisting pushbutton switch 32 is stopped. Consequently, the hoisting signal to the microcomputer 23 is stopped, and the non-contact switching devices 21-1, 21-2 and 21-3 are opened (off) by processing with the microcomputer 23. Thus, the electric current to the three-phase alternating-current electric motor 10 is stopped. At the same time, the brake current to the exciting coil 27a of the electromagnetic brake 27 is stopped, and the electromagnetic brake 27 is mechanically operated to stop (restrain) the rotor of the three-phase alternating-current electric motor 10.

When the lowering pushbutton switch 33 of the operation unit 30 is pressed, a lowering signal is output to the microcomputer 23, and the non-contact switching devices 21-4, 21-2 and 21-5 of the three-phase non-contact device 21 are on-controlled by processing with the microcomputer 23, so that the three-phase alternating-current electric motor 10 is supplied with a three-phase electric current generating a rotating magnetic field for rotating the rotor of the three-phase alternating-current electric motor 10 in the load lowering direction. At the same time, the exciting coil 27a of the electromagnetic brake 27 is supplied with a brake current through the full-wave rectification circuit 26 to release the electromagnetic brake 27. Thus, the rotor of the three-phase alternating-current electric motor 10 rotates to lower (lift down) the load.

When the load reaches a predetermined position, the pressing of the lowering pushbutton switch 33 is stopped. Consequently, the lowering signal to the microcomputer 23 is stopped, and the non-contact switching devices 21-4, 21-2 and 21-5 are opened by processing with the microcomputer 23. Thus, the electric current to the three-phase alternating-current electric motor 10 is stopped. At the same time, the brake current to the exciting coil 27a of the electromagnetic brake 27 is stopped, and the electromagnetic brake 27 is mechanically operated to stop (restrain) the rotor of the three-phase alternating-current electric motor 10.

As has been described above, the control board 20 has a group of supply terminals Rt, St and Tt and a group of output terminals Ut, Vt and Wt provided at a pair of opposing side edges (input side and output side) thereof, respectively, and between the group of supply terminals Rt, St and Tt and the group of output terminals Ut, Vt and Wt are disposed two current paths: a hoisting current path supplying a three-phase alternating current for rotating the rotor of the three-phase alternating-current electric motor 10 in the load hoisting direction (the hoisting current path comprises a combination of the pattern wiring 22-1 and the non-contact switching device 21-1, a combination of the pattern wiring 22-2 and the non-contact switching device 21-2, and a combination of the pattern wiring 22-3 and the non-contact switching device 21-3); and a lowering current path supplying a three-phase alternating current for rotating the rotor of the three-phase alternating-current electric motor 10 in the load lowering direction, which is opposite to the load hoisting direction (the lowering current path comprises a combination of the pattern wiring 22-4 and the non-contact switching device 21-4, a combination of the pattern wiring 22-2 and the non-contact switching device 21-2, and a combination of the pattern wiring 22-5 and the non-contact switching device 21-5).

In the foregoing description, an example has been explained in which the lead wires 11-1, 11-2 and 11-3 from the various phase windings of the three-phase alternating-current electric motor 10 are connected to the output terminals Ut, Vt and Wt of the control board 20 of the electric motor-driven hoisting-lowering device control apparatus according to the present invention, and the rotor of the three-phase alternating-current electric motor 10 is operation-controlled in the load hoisting direction or the load lowering direction. The electric motor-driven hoisting-lowering device control apparatus according to the present invention is configured to enable an electric motor-driven hoisting-lowering device and a control apparatus therefor to be constructed simply by connecting additional simple external wiring to a single-phase alternating-current power supply and further connecting lead wires from a single-phase alternating-current electric motor to the output terminals Ut, Vt and Wt on the output side of the control board 20 without changing the control board 20 itself. The following is a detailed explanation of an example of an electric motor-driven hoisting-lowering device control apparatus using a single-phase alternating-current electric motor as a load hoisting-lowering electric motor.

Figure 2:
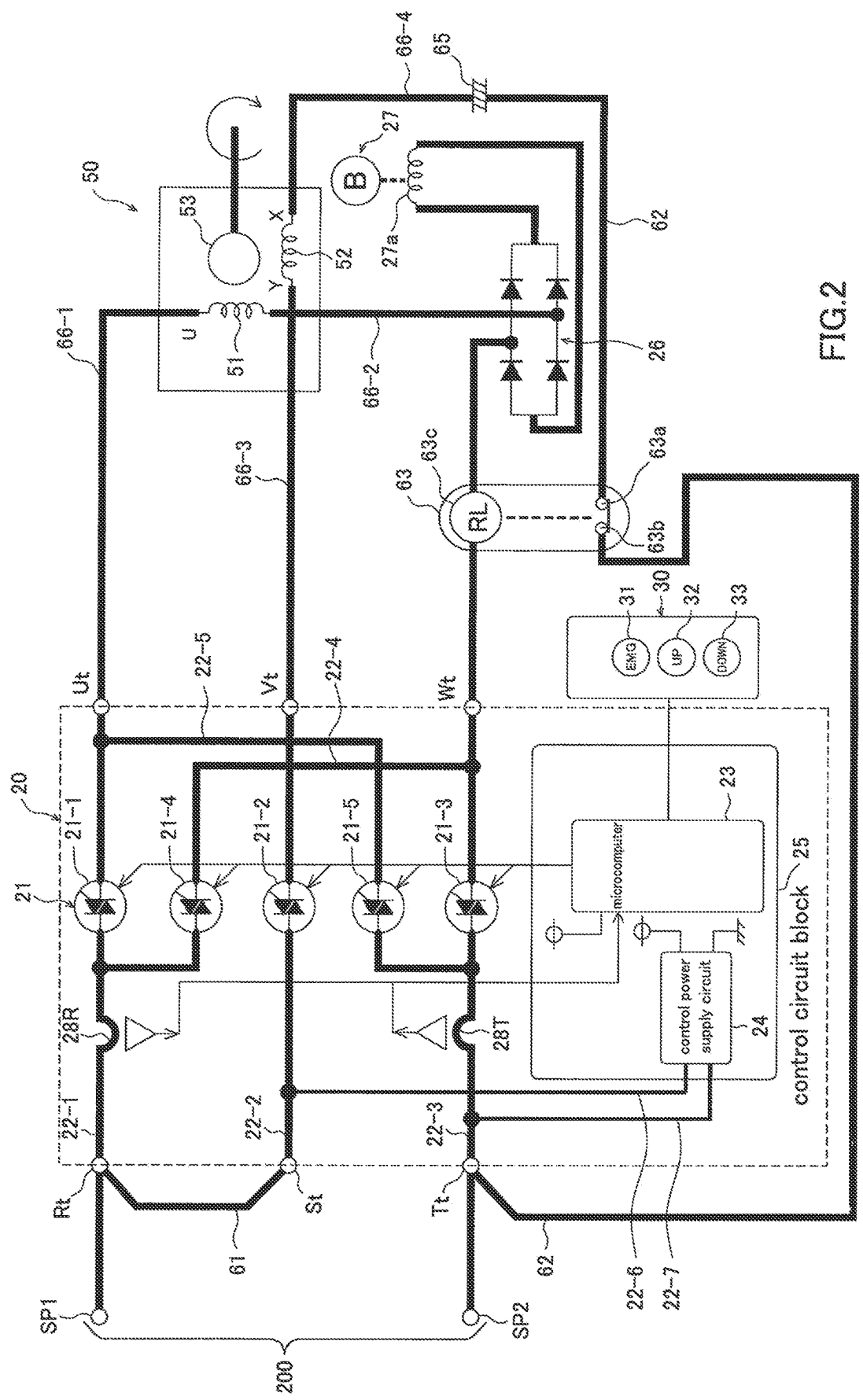
FIG. 2 is a diagram showing a configuration example in which a single-phase alternating-current electric motor is connected to the output part of the electric motor-driven hoisting-lowering device control apparatus according to the present invention.

FIG. 2 is a diagram showing a configuration example of an electric motor-driven hoisting-lowering device control apparatus using a single-phase alternating-current electric motor 50 (single-phase induction electric motor in this example) as a load hoisting-lowering electric motor. In FIG. 2, the control board 20 itself has the same configuration as that of the control board 20 of the electric motor-driven hoisting-lowering device control apparatus shown in FIG. 1. That is, the control board 20 has three supply terminals Rt, St, Tt on an input side thereof and three output terminals Ut, Vt, Wt on an output side thereof. A non-contact switching device 21-1 is disposed between the supply terminal Rt and the output terminal Ut through a pattern wiring 22-1. A non-contact switching device 21-2 is disposed between the supply terminal St and the output terminal Vt through a pattern wiring 22-2. A non-contact switching device 21-3 is disposed between the supply terminal Tt and the output terminal Wt through a pattern wiring 22-3. Further, a non-contact switching device 21-4 is disposed between the supply terminal Rt and the output terminal Wt through a pattern wiring 22-4, and a non-contact switching device 21-5 is disposed between the supply terminal Tt and the output terminal Ut through a pattern wiring 22-5.

In FIG. 2, two crossover wires (external wiring) 61 and 62 are added to the input side of the control board 20 where the supply terminals Rt, St and Tt are disposed. The first crossover wire 61 is connected to the supply terminal Rt and the supply terminal St to electrically unite (short-circuit) the two terminals, and one end of the crossover wire 61 is defined as a single-phase alternating-current power supply terminal SP1 to which is connected one terminal of a single-phase alternating-current power supply 200 (commercial single-phase power supply). The second crossover wire 62 is connected to the supply terminal Tt and a contact 63b of a motor start relay 63 to electrically unite (short-circuit) the supply terminal Tt and the contact 63b, and one end of the crossover wire 62 is defined as a single-phase supply terminal SP2 to which is connected the other terminal of the single-phase alternating-current power supply (commercial single-phase power supply) 200. In addition, a contact 63a of the motor start relay 63 is connected to a phase-advancing capacitor 65 through the second crossover wire 62.

A single-phase alternating-current electric motor 50 is disposed on the output side of the control board 20 where the output terminals Ut, Vt and Wt are disposed. The single-phase alternating-current electric motor 50 is configured to include a main winding 51 and an auxiliary winding 52. One end U of the main winding 51 is connected to the output terminal Ut of the control board 20 through a lead wire 66-1, and the other end V of the main winding 51 is connected to a midpoint of a full-wave rectification circuit 26 through a lead wire 66-2. The output end of the full-wave rectification circuit 26 is connected to one end of the exciting coil 27a of the electromagnetic brake 27. The other end of the exciting coil 27a is connected to the output terminal Wt of the control board 20 via the full-wave rectification circuit 26 and an operating coil 63c of the motor start relay 63. One end Y of the auxiliary winding 52 is connected to the output terminal Vt of the control board 20 through a lead wire 66-3, and the other end X of the auxiliary winding 52 is connected to one end of the phase-advancing capacitor 65 through a lead wire 66-4. The other end of the phase-advancing capacitor 65 is connected to the supply terminal Tt via the crossover wire 62, the contacts 63a and 63b of the motor start relay 63, and the crossover wire 62, as has been described above.

The electric motor-driven hoisting-lowering device control apparatus shown in FIG. 2 also has an operation unit 30 including an emergency pushbutton switch 31, a hoisting pushbutton switch 32, a lowering pushbutton switch 33, etc. and further has a control circuit block 25 including a microcomputer 23 and a control power supply circuit 24, in the same way as in FIG. 1. When the hoisting pushbutton switch 32, for example, of the operation unit 30 is pressed in a state where the single-phase alternating-current power supply 200 has been connected between the single-phase alternating-current power supply terminals SP1 and SP2 and turned on, a hoisting signal is output to the microcomputer 23, and the non-contact switching devices 21-1, 21-2 and 21-3 are on-controlled by processing with the microcomputer 23.

Thus, a main electric current flows from the output terminal Ut of the control board 20 through the lead wire 66-1 and from the one end U of the main winding 51 of the single-phase alternating-current electric motor 50 through the other end V of the main winding 51 and further flows to the single-phase supply terminal SP2 via the full-wave rectification circuit 26, to which the exciting coil 27a of the electromagnetic brake 27 is connected, and the operating coil 63c of the motor start relay 63, and further the output terminal Wt, the pattern wiring 22-3, the non-contact switching device 21-3, and the supply terminal Tt of the control board 20. Here, a current path comprising the main winding 51, the full-wave rectification circuit 26, etc. will be referred to as a "main winding current path". The main winding 51, the full-wave rectification circuit 26, and the operating coil 63c of the motor start relay 63 are only needed to be connected in series, and therefore may be arranged in a way other than that shown in FIG. 2, which has been described above. For example, the exciting coil 27a of the electromagnetic brake 27 may be connected between the output terminal Ut and the one end U of the main winding 51.

In addition, an auxiliary electric current flows from the output terminal Vt of the control board 20 through the lead wire 66-3 to the auxiliary winding 52 of the single-phase alternating-current electric motor 50 to flow from the one end Y to other end X of the auxiliary winding 52. Further, the auxiliary electric current flows via the lead wire 66-4 and the phase-advancing capacitor 65 and via the crossover wire 62, the contacts 63a and 63b of the motor start relay 63, and the crossover wire 62 to the single-phase supply terminal SP2. Here, a current path comprising the auxiliary winding 52, the phase-advancing capacitor 65, the contacts (63a, 63b) of the motor start relay 63, etc. will be referred to as an "auxiliary winding current path". The auxiliary winding 52, the phase-advancing capacitor 65, and the contacts (63a, 63b) of the motor start relay 63 are only needed to be connected in series, and therefore may be arranged in a way other than that shown in FIG. 2, which has been described above. For example, the phase-advancing capacitor 65 for starting may be disposed between the output terminal Vt and the one end Y of the auxiliary winding 52.

As has been described above, the main alternating current flows to the main winding 51 of the single-phase alternating-current electric motor 50 from the control board 20 through the main winding current path, and the auxiliary alternating current flows to the auxiliary winding 52 through the auxiliary winding current path via the phase-advancing capacitor 65. Consequently, a phase difference is produced between the main alternating current and the auxiliary alternating current, and a rotating magnetic field is generated in the stator of the single-phase alternating-current electric motor 50, which causes a rotor 53 of the single-phase alternating-current electric motor 50 to rotate forward in a direction for hoisting a load. Consequently, the rotor 53 rotates in the same direction as the rotating direction of the rotating magnetic field. Thus, the rotor 53 of the single-phase alternating-current electric motor 50 starts rotating in a direction designated by the microcomputer 23 to hoist the load. It should be noted that when the main alternating current flowing through the main winding 51 becomes not greater than a predetermined current value, the motor start relay 63 is activated to open the contacts 63a and 63b, thereby cutting off the auxiliary electric current flowing through the above-described auxiliary winding current path. This makes it possible to eliminate the auxiliary electric current flowing through the auxiliary winding current path after the single-phase alternating-current electric motor has started and reached a predetermined rotation, and hence possible to achieve energy conservation.

On the other hand, when the lowering pushbutton switch 33 of the operation unit 30 is pressed, the rotation direction of the rotating magnetic field generated in the stator of the single-phase alternating-current electric motor 50 needs to be reversed relative to the above-described load hoisting direction. That is, it is necessary to switch the electrical connection of the output terminals Ut and Wt and the input terminals Rt and Tt so that the electrical connection is reversed from each other between when load hoisting is carried out and when load lowering is carried out in order to reverse the phase of the main electric current flowing through the main winding 51 of the single-phase alternating-current electric motor 50 by 180 degrees (phase is shifted 180 degrees) while keeping the same the phase of the auxiliary winding electric current flowing through the auxiliary winding 52 of the single-phase alternating-current electric motor 50 (i.e. no change in phase) regardless of whether the operation is hoisting or lowering. Here, for load hoisting, the non-contact switching device 21-1, the non-contact switching device 21-3, and the non-contact switching device 21-2 are on-controlled, and for load lowering, the non-contact switching device 21-4, the non-contact switching device 21-5, and the non-contact switching device 21-2 are on-controlled, thereby allowing the phase of the main electric current flowing through the main winding 51 to be reversed 180 degrees when load hoisting and load lowering are switched from one to another. Specifically, switching is performed as follows. When the hoisting pushbutton switch 32 is pressed, the non-contact switching device 21-1 and the non-contact switching devices 21-3 and 21-2 are on-controlled by processing with the microcomputer 23, so that the single-phase alternating-current power supply terminal SP1 is electrically connected to the one end U of the main winding 51 via the non-contact switching device 21-1, and that the single-phase alternating-current power supply terminal SP2 is electrically connected to the other end V of the main winding 51 via the non-contact switching device 21-3. When the lowering pushbutton switch 33 is pressed, the non-contact switching device 21-4, the non-contact switching device 21-5, and the non-contact switching device 21-2 are on-controlled by processing with the microcomputer 23, so that the single-phase alternating-current power supply terminal SP2 is electrically connected to the one end U of the main winding 51 via the non-contact switching device 21-5, and that the single-phase alternating-current power supply terminal SP1 is electrically connected to the other end V of the main winding 51 via the non-contact switching device 21-4. On the other hand, regarding the one end Y and other end X of the auxiliary winding 52, when either the hoisting pushbutton switch 32 or the lowering pushbutton switch 33 is pressed, the one end Y is electrically connected to the single-phase alternating-current power supply terminal SP1 via the non-contact switching device 21-2 and the first crossover wire 61, and the other end X is electrically connected to the single-phase alternating-current power supply terminal SP2 via the phase-advancing capacitor 65, the contacts 63a and 63b of the motor start relay 63, and the second crossover wire 62.

It should be noted that, in the load lowering operation also, when the main alternating current flowing through the main winding 51 becomes not greater than a predetermined current value, the motor start relay 63 is activated at a predetermined timing to open the contacts 63a and 63b, thereby cutting off the auxiliary electric current flowing through the above-described auxiliary winding current path. Thus, in the load hoisting-lowering operation, when the auxiliary electric current flowing through the auxiliary winding current path becomes not greater than a predetermined current value, the auxiliary electric current is cut off. Consequently, no auxiliary electric current flows through the auxiliary winding current path after the single-phase alternating-current electric motor has started and reached a predetermined rotation, and thus energy conservation is achieved. Although an example has been described herein in which the motor start relay 63 is used to turn on or off the electric current flowing through the auxiliary winding 52, it is also possible to use any other non-contact switch or contact switch capable of turning on or off the electric current flowing through the auxiliary winding 52.

Figure 3:
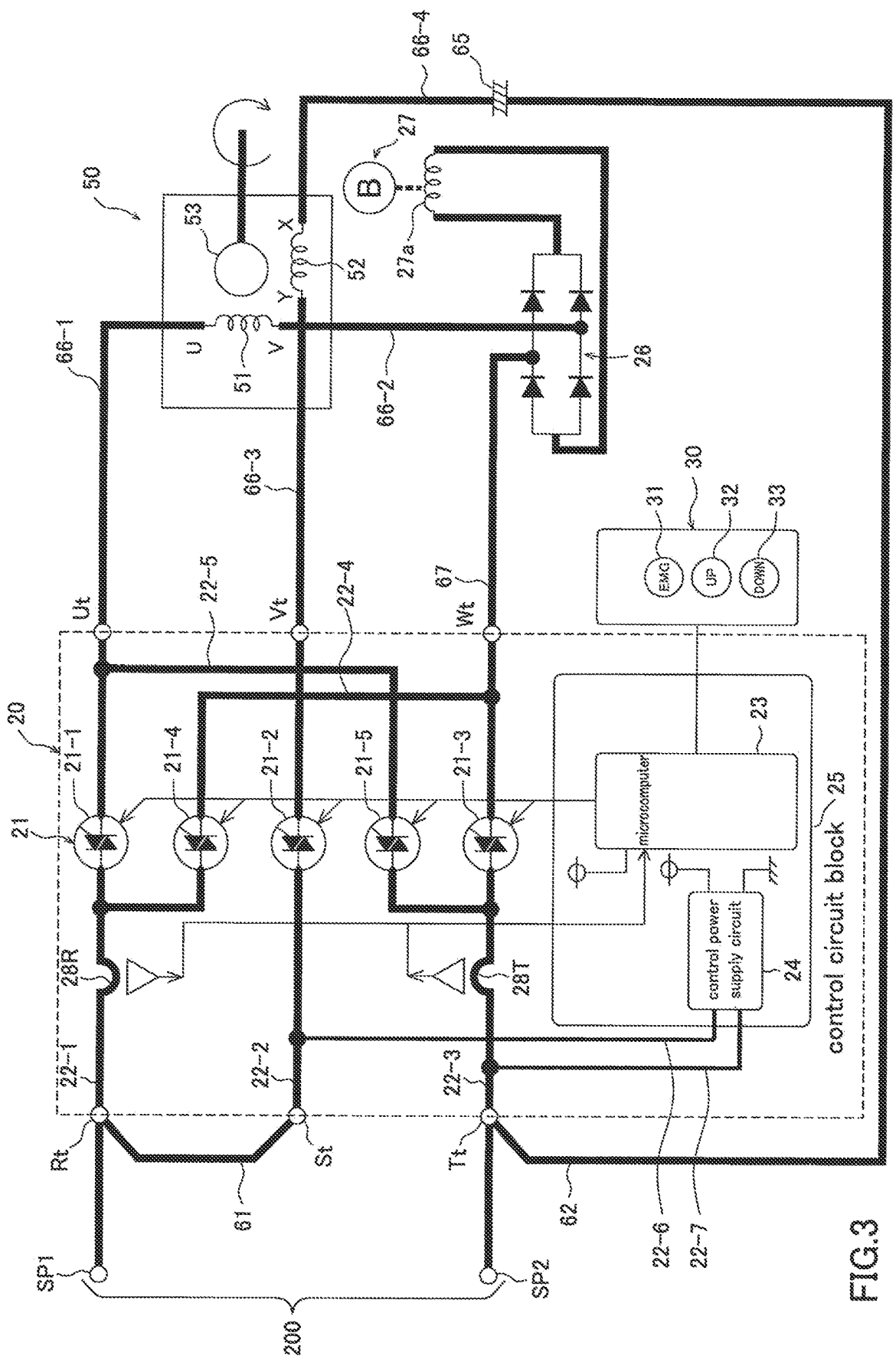
FIG. 3 is a diagram showing a configuration example in which the single-phase alternating-current electric motor is connected to the output part of the electric motor-driven hoisting-lowering device control apparatus according to the present invention.

FIG. 3 is a diagram showing another configuration example of the electric motor-driven hoisting-lowering device control apparatus using the single-phase alternating-current electric motor 50 as a load hoisting-lowering electric motor in the same way as in FIG. 2. The electric motor-driven hoisting-lowering device control apparatus shown in FIG. 3 differs from that shown in FIG. 2 in that the control apparatus in FIG. 3 has the other end V of the main winding 51 of the single-phase alternating-current electric motor 50 connected directly to the output terminal Wt of the control board 20 via the full-wave rectification circuit 26, the exciting coil 27a of the electromagnetic brake 27, and the full-wave rectification circuit 26 without using the motor start relay 63 (in FIG. 2, the other end V of the main winding 51 is connected to the output terminal Wt of the control board 20 via the operating coil 63c of the motor start relay 63 after being led out from the full-wave rectification circuit 26), and further differs therefrom in that the other end X of the auxiliary winding 52 of the single-phase alternating-current electric motor 50 is connected to the single-phase alternating-current power supply terminal SP2 via the phase-advancing capacitor 65 and the crossover wire (second external wiring) 62 (in FIG. 2, the other end X of the auxiliary winding 52 is connected to the single-phase alternating-current power supply terminal SP2 via the contacts 63a and 63b of the motor start relay 63 and the crossover wire (second external wiring) 62 after being led out from the phase-advancing capacitor 65).

In the electric motor-driven hoisting-lowering device control apparatus shown in FIG. 3, when the hoisting pushbutton switch 32, for example, of the operation unit 30 is pressed, an on-signal is output from the microcomputer 23 of the control circuit block 25 to the non-contact switching devices 21-1 and 21-2 of the control board 20, and a single-phase alternating current is supplied from the output terminals Ut and Vt to the main winding 51 and auxiliary winding 52 of the single-phase alternating-current electric motor 50. Consequently, a phase difference corresponding to the electrostatic capacity of the phase-advancing capacitor 65 is generated between the main electric current and the auxiliary electric current flowing through the main winding 51 and auxiliary winding 52, respectively, of the single-phase alternating-current electric motor 50, and a rotating magnetic field causing the rotor 53 to rotate in the load hoisting direction is generated in the stator of the single-phase alternating-current electric motor 50. Thus, the rotor 53 is rotated in the rotation direction of the rotating magnetic field. In this point and in terms of switching between forward and reverse rotation of the single-phase alternating-current electric motor 50, the electric motor-driven hoisting-lowering device control apparatus shown in FIG. 3 is the same as that shown in FIG. 2. In this example, when the current value of the main electric current becomes not greater than a predetermined value, an off-signal is output from the microcomputer 23 to the non-contact switching device 21-2 at a predetermined timing, and the non-contact switching device 21-2 turns off. Thus, the auxiliary electric current flowing through the auxiliary winding 52 is cut off (in the electric motor-driven hoisting-lowering device control apparatus shown in FIG. 2, when the value of the main electric current becomes not greater than a predetermined value, the motor start relay 63 is activated to turn off the contacts 63a and 63b thereof, thereby cutting off the auxiliary electric current).

As has been described above, the electric motor-driven hoisting-lowering device control apparatus shown in FIG. 3 is the same as that shown in FIG. 2 in that the single-phase alternating current from the output terminals Ut and Vt of the control board 20 flows through the main winding 51 and auxiliary winding 52 of the single-phase alternating-current electric motor 50, thereby causing a rotating magnetic field to be generated in the stator of the single-phase alternating-current electric motor 50, and thus rotating the rotor 53 of the single-phase alternating-current electric motor 50 in the load hoisting or lowering direction. The electric motor-driven hoisting-lowering device control apparatus shown in FIG. 3 is also the same as that shown in FIG. 2 in that after a predetermined time has elapsed since the start of rotation of the single-phase alternating-current electric motor 50 in the load hoisting or lowering direction (e.g. at timing when rotation becomes stable), the non-contact switching device 21-2 is turned off by a command signal from the microcomputer 23, thereby stopping the electric current flowing through the auxiliary winding 52 of the single-phase alternating-current electric motor 50 after turning off, and thus making it possible to eliminate the energy consumed in the auxiliary winding 52 and so forth thereafter and hence possible to expect advantages from the viewpoint of energy conservation. The electric motor-driven hoisting-lowering device control apparatus shown in FIG. 3 can be constructed at a cost reduced by an amount corresponding to the cost of the motor start relay 63 otherwise used.

When a three-phase alternating-current electric motor is used as the load hoisting-lowering electric motor used in the electric motor-driven hoisting-lowering device, as shown in FIG. 1, the interphase voltage (voltage between the S phase and the T phase) of the three-phase alternating-current power supply 100 is introduced into the control power supply circuit 24. When a single-phase alternating-current electric motor is used as the load hoisting-lowering electric motor used in the electric motor-driven hoisting-lowering device, as shown in FIG. 2 or 3, the single-phase voltage of the single-phase alternating-current power supply 200 is introduced into the control power supply circuit 24. Further, as shown in FIG. 5, the single-phase voltage 115V/230V (commercial single-phase alternating-current power supply voltage) is doubled by a voltage doubler circuit of the control power supply circuit 24, thereby producing a voltage having the same value as the interphase voltage 230V/460V (commercial three-phase alternating-current power supply voltage) of the three-phase alternating-current power supply 100. Further, the alternating current (AC) 230V/460V is converted into a direct current (DC) 325V/650V by the control power supply circuit 24, thereby making the control circuit block 25 compatible with single-phase and three-phase alternating-current electric motors.

FIG. 6 is a diagram showing a configuration example of a voltage doubler circuit 40 of the control power supply circuit 24. The voltage doubler circuit 40 includes an input part 41, a single-phase power supply changeover switch 42, a single-phase AC-DC converter 43, a direct-current circuit 44, and an output part 45. The single-phase power supply changeover switch 42 has fixed contacts 42a and 42b and a switching piece 42c. The single-phase AC-DC converter 43 has four diodes $D_1$ to $D_4$. The cathode of the diode $D_1$ and the anode of the diode $D_3$ are connected, and the cathode of the diode $D_2$ and the anode of the diode $D_4$ are connected. The anodes of the diodes $D_1$ and $D_2$ are connected to anode wiring P, and the cathodes of the diodes $D_3$ and $D_4$ are connected to cathode wiring N, thereby forming a diode bridge. The direct-current circuit 44 includes four capacitors $C_1$ to $C_4$ and two resistors $R_1$ and $R_2$. A series circuit of the capacitors $C_1$ and $C_3$ and a series circuit of the capacitors $C_2$ and $C_4$ have their opposite ends connected to the anode wiring P and the cathode wiring N, respectively. Further, a series circuit of the resistors $R_1$ and $R_2$ has its opposite ends connected to the anode wiring P and the cathode wiring N, respectively. One end of the anode wiring P is connected to a terminal 45a of the output part 45, and one end of the cathode wiring N is connected to a terminal 45b of the output part 45.

An input terminal 41a of the input part 41 is connected to between the diodes $D_1$ and $D_3$ of the single-phase AC-DC converter 43, and an input terminal 41b of the input part 41 is connected to one end of the switching piece 42c of the single-phase power supply changeover switch 42. The fixed contact 42a of the single-phase power supply changeover switch 42 is connected to between the diodes $D_2$ and $D_4$ of the single-phase AC-DC converter 43, and the fixed contact 42b of the single-phase power supply changeover switch 42 is connected to between the capacitors $C_1$ and $C_2$ of the direct-current circuit 44 and to between the capacitors $C_2$ and $C_4$ thereof and to between the resistors $R_1$ and $R_2$ thereof. Further, the respective one ends of the anode wiring P and the cathode wiring N, which are disposed common to the single-phase AC-DC converter 43 and the direct-current circuit 44, are connected to the terminals 45a and 45b, respectively, of the output part 45.

In the above-described voltage doubler circuit 40, the input terminals 41a and 41b of the input part 41 are connected with the pattern wirings 22-6 and 22-7, which are branched from the pattern wirings 22-2 and 22-3 connected to the supply terminals St and Tt shown in FIGS. 1 to 3, and a direct-current voltage is output from the terminals 45a and 45b of the output part 45 to the control power supply circuit 24 through the voltage doubler circuit 40.

When the single-phase alternating-current electric motor 50 is used and the control power supply circuit 24 has the voltage doubler circuit 40 arranged as shown in FIG. 6, and when the single-phase power supply voltage value is 115V, the switching piece 42c of the single-phase power supply changeover switch 42 is switched to the fixed contact 42b side. As a result, the connection point between the smoothing capacitors $C_1$ and $C_3$ of the direct-current circuit 44 and the connection point between the smoothing capacitors $C_2$ and $C_4$ thereof and further the connection point between the resistors $R_1$ and $R_2$ thereof are connected to the input terminal 41b (single-phase alternating-current power supply terminal SP2). Consequently, the single-phase alternating-current power supply voltage of 115V input between the single-phase alternating-current power supply terminal SP1 and SP2 shown in FIGS. 2 and 3 is converted into an alternating current (AC) voltage having the same value as the interphase voltage of 460V of the three-phase alternating-current power supply 100, and the alternating current (AC) voltage 460 is converted into a direct current (DC) 325V/650V through the control power supply circuit 24, thereby making the control circuit block 25 compatible with three-phase and single-phase applications.

As has been described above, the control circuit block 25 mounted on the control board 20 is provided with the microcomputer 23 and the control power supply circuit 24. The microcomputer 23 has stored therein programs for on-off controlling each of the non-contact switching devices 21-1 to 21-5 in correspondence to a voltage input to the three-phase non-contact device (three-phase solid-state relay SSR) 21. The microcomputer 23 monitors an alternating-current voltage input to each of the non-contact switching devices 21-1 to 21-5 of the three-phase non-contact device 21, calls a program corresponding to the input alternating-current voltage, and executes each program to perform operation control of the electric motor-driven hoisting-lowering device.

Figure 7:
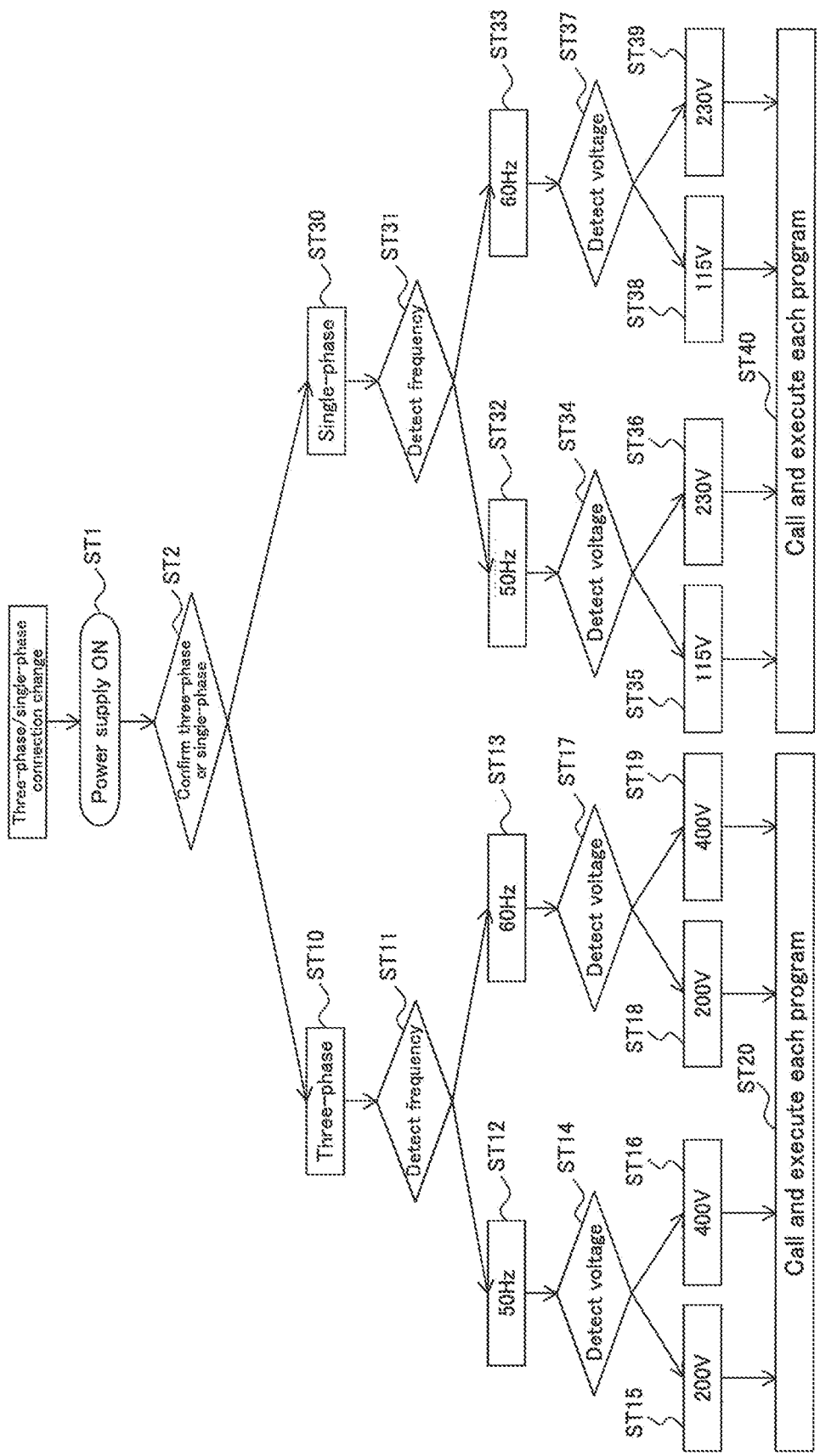
FIG. 7 is a diagram showing a control flow of the electric motor-driven hoisting-lowering device control apparatus according to the present invention.

FIG. 7 is a diagram showing a processing flow for controlling the load hoisting-lowering operation. Here, it is desirable that the control board 20, for example, should be provided with a DIP (Dual In-line Package) switch beforehand, although not shown, for switching whether to use a three-phase alternating-current electric motor or a single-phase alternating-current electric motor as an electric motor for hoisting and lowering a load so that mode change can be made by operating the DIP switch to switch whether to use a three-phase electric motor or a single-phase electric motor as a load hoisting-lowering electric motor of the electric motor-driven hoisting-lowering device when the wiring is changed to the state shown in FIG. 1 or to the state shown in FIG. 2 or 3.

First, either three-phase or single-phase is set by operating the DIP switch as described above, and the power supply is turned on at step ST1. Next, at step ST2, it is confirmed whether the power supply is three-phase or single-phase. If the power supply is three-phase, the process proceeds to a three-phase processing flow at step ST10. If the power supply is single-phase, the process proceeds to a single-phase processing flow at step ST30.

In the three-phase processing flow at step ST10, first, at step ST11, frequency is detected, and if the detected frequency is 50 Hz, the process proceeds to a 50 Hz processing flow at step ST12. If the detected frequency is 60 Hz, the process proceeds to a 60 Hz processing flow at step ST13. In the 50 Hz processing flow at step ST12, first, at step ST14, voltage is detected, and if the detected voltage is 200V (230V in FIG. 5), the process proceeds to 200V processing at step ST15. If the detected voltage is 400V (460V in FIG. 5), the process proceeds to 400V (460V in FIG. 5) processing at step ST16. In the 60 Hz processing flow at step ST13, first, at step ST17, voltage is detected, and if the detected voltage is 200V (230V in FIG. 5), the process proceeds to 200V processing at step ST18. If the detected voltage is 400V (460V in FIG. 5), the process proceeds to a 400V processing flow at step ST19. After termination of the processing at each of steps ST15, ST16, ST18 and ST19, the process proceeds to step ST20, where each associated program is called to execute the operation processing of the three-phase alternating-current electric motor 10.

In the single-phase processing flow at step ST30, first, at step ST31, frequency is detected, and if the detected frequency is 50 Hz, the process proceeds to a 50 Hz processing flow at step ST32. If the detected frequency is 60 Hz, the process proceeds to a 60 Hz processing flow at step ST33. In the 50 Hz processing flow at step ST32, first, at step ST34, voltage is detected, and if the detected voltage is 115V (115V in FIG. 5), the process proceeds to 115V processing at step ST35. If the detected voltage is 230V, the process proceeds to 230V processing at step ST36. In the 60 Hz processing flow at step ST33, first, at step ST37, voltage is detected, and if the detected voltage is 115V (115V in FIG. 5), the process proceeds to a 115V processing flow at step ST38. If the detected voltage is 230V (230V in FIG. 5), the process proceeds to 230V processing at step ST39. After termination of the processing at each of the steps ST35, ST36, ST38 and ST39, the process proceeds to step ST40 where each associated program is called to execute operation processing of the single-phase alternating-current electric motor 50.

As has been described above, the electric motor-driven hoisting-lowering device control apparatus (see FIG. 1) using the three-phase alternating-current electric motor 10 and the electric motor-driven hoisting-lowering device control apparatus (see FIGS. 2 and 3) using the single-phase alternating-current electric motor 50 are constructed by using the control board 20 compatible therewith. In the load hoisting-lowering operation performed by using the control apparatus, it is necessary to measure an electric current and electric power supplied to each electric motor (three-phase alternating-current electric motor 10 and single-phase alternating-current electric motor 50). When the electric motor is the three-phase alternating-current electric motor 10, as shown in FIG. 1, an R-phase current flowing through the pattern wiring 22-1 and a T-phase current flowing through the pattern wiring 22-3 are measured by the current sensors 28R and 28T, respectively, and the measured values are sent to the microcomputer 23 to calculate electric currents, together with electric power, by processing with the microcomputer 23.

When the electric motor is the single-phase alternating-current electric motor 50, as shown in FIGS. 2 and 3, a main electric current flowing through the main winding 51 of the single-phase alternating-current electric motor 50 is measured by the current sensor 28R, and the measured main electric current value is sent to the microcomputer 23 to calculate a main electric current by processing with the microcomputer 23. It should be noted here that the auxiliary electric current of the single-phase alternating-current electric motor 50 is cut off by opening of the non-contact switching device 21-2 when the rotation of the single-phase alternating-current electric motor 50 becomes stable after a predetermined time has elapsed since the start thereof; therefore, the auxiliary electric current flowing through the auxiliary winding 52 is usually not taken into account in the electric power calculation for calculating a load applied to the output shaft of the electric motor.

When the electric motor is the three-phase alternating-current electric motor 10, a three-phase alternating-current power supply 100 with a voltage of 200V to 230V or 400V to 460V is used. When the electric motor is the single-phase alternating-current electric motor 50, a single-phase alternating-current power supply 200 with a voltage of 115V or 230V is used. When the single-phase alternating-current electric motor 50 is connected to the control board 20, a hoisting electric current (main electric current) flowing through the main winding 51 of the single-phase alternating-current electric motor 50 also flows through the current sensors 28R and 28T for measuring the R- and T-phase hoisting electric currents IR and IT of the three-phase alternating-current electric motor 10. Therefore, the measuring ranges of the current sensors 28R and 28T are determined based on the hoisting electric current (main electric current) flowing through the main winding 51 of the single-phase alternating-current electric motor 50. The value of current flowing through each phase of the three-phase alternating-current electric motor 10 is, however, not greater than a half of the hoisting electric current (main electric current) flowing through the main winding 51 of the single-phase alternating-current electric motor 50, and is therefore not suitable for calculating an electric current value and electric power value of the three-phase alternating-current electric motor 10. In addition, in order to accurately detect the electric current values and electric power values of both the electric motors with a microcomputer, there have been technical problems to be solved to make the control apparatus compatible with three-phase and single-phase applications in terms of size and cost, for example, complication of the circuit. Further, it has been impossible to detect an auxiliary electric current flowing through the auxiliary winding 52 of the single-phase alternating-current electric motor 50.

Figure 8:
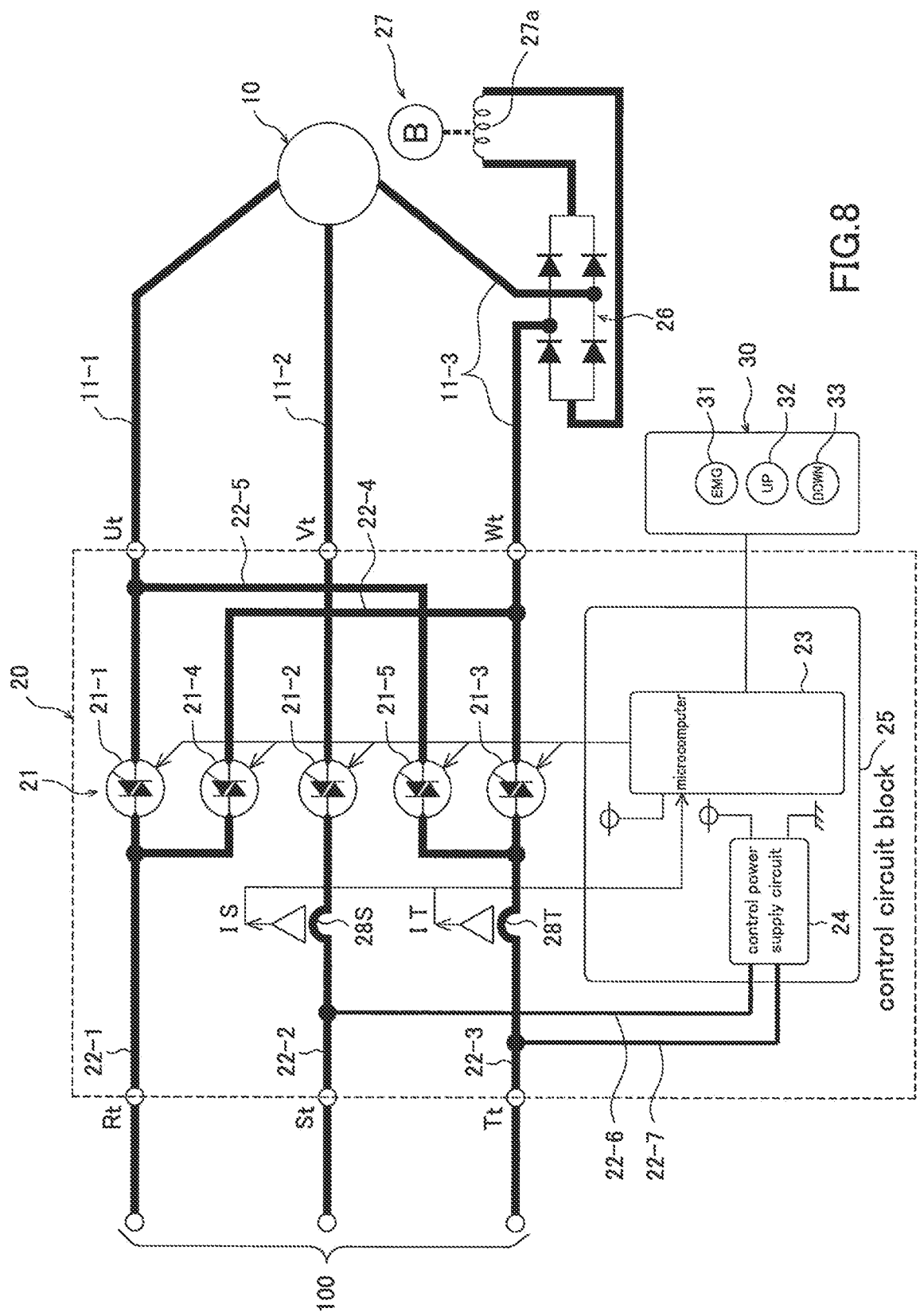
FIG. 8 is a diagram showing a configuration example in which the three-phase alternating-current electric motor is connected to the output part of the electric motor-driven hoisting-lowering device control apparatus according to the present invention.

FIG. 8 is a diagram showing a basic general configuration example of an electric motor-driven hoisting-lowering device control apparatus developed to solve the above-described problems, which shows an example in which the three-phase alternating-current electric motor 10 is used as an electric motor. The electric motor-driven hoisting-lowering device control apparatus differs from the electric motor-driven hoisting-lowering device control apparatus shown in FIG. 1 in the following points. The current sensor 28R provided on the pattern wiring 22-1 of the control board 20 for supplying the R-phase electric current to the stator of the three-phase alternating-current electric motor 10 is removed; instead, a current sensor (Hall IC) 28S is provided on the pattern wiring 22-2 for supplying the S-phase electric current to the stator of the three-phase alternating-current electric motor 10. Further, the upper-limit value of the electric current measuring range of the current sensor 28S is set (7 A) based on the S-phase electric current flowing through the three-phase alternating-current electric motor 10, and the upper-limit value of the electric current measuring range of the current sensor (Hall IC) 28T is set (15 A) based on the electric current flowing through the main winding of the single-phase alternating-current electric motor shown in FIG. 9 described later. Thus, it is possible to improve the control board to be optimum for and compatible with the three-phase alternating-current electric motor and the single-phase alternating-current electric motor by using two current sensors 28S and 28T having different upper-limit values of the electric current measuring range. It should be noted that the withstand current value of the current sensor 28S, which has a narrow measuring range selected based on the value of electric current flowing through the three-phase alternating-current electric motor 10, is set so as to sufficiently exceed the maximum value of electric current flowing through the auxiliary winding 52 of the single-phase alternating-current electric motor 50.

Figure 9:
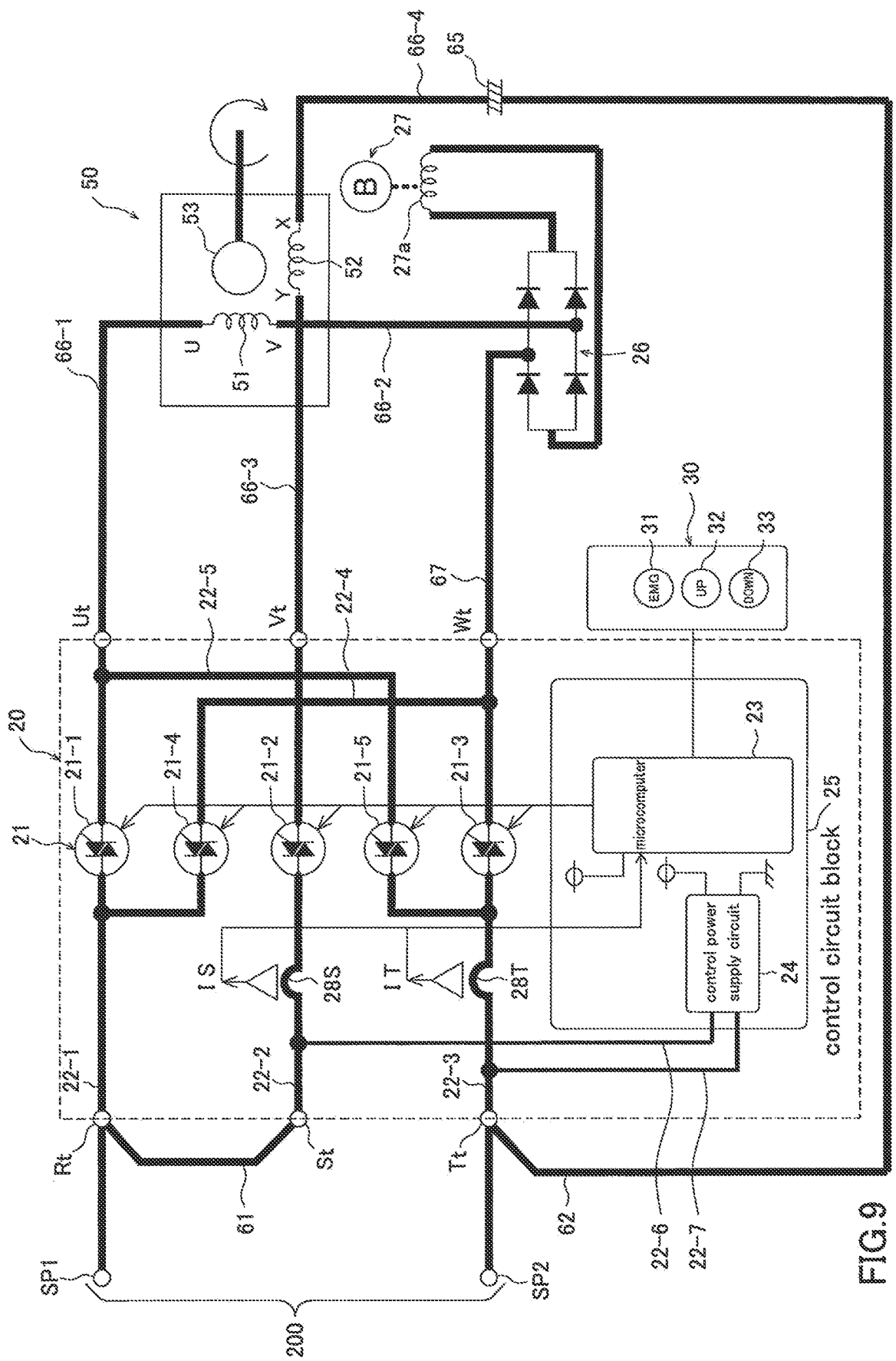
FIG. 9 is a diagram showing a configuration example in which the single-phase alternating-current electric motor is connected to the output part of the electric motor-driven hoisting-lowering device control apparatus according to the present invention.

FIG. 9 is a diagram showing a basic general configuration example of an electric motor-driven hoisting-lowering device control apparatus developed to solve the above-described problems, which shows an example in which the single-phase alternating-current electric motor 50 is used as an electric motor. The electric motor-driven hoisting-lowering device control apparatus differs from the electric motor-driven hoisting-lowering device control apparatus shown in FIG. 3 in the following points. The current sensor 28R provided on the pattern wiring 22-1 of the control board 20 for supplying an electric current to the main winding 51 of the single-phase alternating-current electric motor 50 is removed; instead, a current sensor 28S is provided on the pattern wiring 22-2 for supplying an electric current to the auxiliary winding 52 of the single-phase alternating-current electric motor 50 (the arrangement is the same as that of the control board 20 of the electric motor-driven hoisting-lowering device control apparatus shown in FIG. 8). Further, the upper-limit value of the electric current measuring range of the current sensor 28S is set (7 A) based on an S-phase electric current flowing through the stator of the three-phase alternating-current electric motor 10, which is shown in FIG. 8 described above, and the upper-limit value of the electric current measuring range of the current sensor 28T provided on the pattern wiring 22-3 for supplying an electric current to the main winding 51 of the single-phase alternating-current electric motor 50 is set (15 A) based on an electric current flowing through the main winding 51 of the single-phase alternating-current electric motor 50. That is, the detection (measurement) of electric current and electric power of the single-phase alternating-current electric motor 50 is improved by using together two current sensors 28S and 28T having different electric current measuring ranges. By improving the electric current detection accuracy as described above, the circuit (including the control board 20) of the single-phase alternating-current electric motor can be made compatible with the three-phase alternating-current electric motor, despite the fact that the single-phase alternating-current electric motor has a rated current value not less than twice that of the three-phase alternating-current electric motor.

Generally, in a single-phase alternating-current electric motor, the main winding and the auxiliary winding are supplied with electric currents simultaneously at the time of starting the electric motor, and when the electric motor reaches a predetermined rotation speed, the electric current to the auxiliary winding is cut off; therefore, the electric current flowing through the main winding is important in the detection (measurement) of electric current and electric power. Therefore, in the electric motor-driven hoisting-lowering device control apparatus arranged as shown in FIG. 9, the auxiliary electric current flowing through the auxiliary winding 52 is only supplied at the time mainly of starting the single-phase alternating-current electric motor 50 to perform a load hoisting-lowering operation, and when the rotation speed reaches a predetermined rotation speed, the auxiliary electric current flowing through the auxiliary winding 52 is cut off by turning off the non-contact switching device 21-2 by control of the microcomputer 23. Accordingly, even if the measurement of the current sensor 28S exceeds the set maximum value, the influence thereof is small as long as the measured current value is within the range of withstand current value of the current sensor 28S. In the electric motor-driven hoisting-lowering device control apparatus shown in FIG. 9, the detection upper limit value of the current sensor 28S for detecting an auxiliary electric current flowing through the auxiliary winding 52 of the single-phase alternating-current electric motor 50, is set to 7 A. The current sensor 28S cannot accurately measure the value of electric current flowing through the auxiliary winding 52 at the time of starting but can be used to detect an open phase of the auxiliary winding and so forth. The electric motor-driven hoisting-lowering device control apparatus using a three-phase alternating-current electric motor needs two current sensors to detect electric current and electric power accurately as described above. In this regard, by using one current sensor 28S having a narrow measuring range with an upper-limit value of 7 A selected based on the electric current flowing through a three-phase alternating-current electric motor and one current sensor 28T having a wide electric current measuring range with an upper-limit value of 15 A selected based on the electric current flowing through a single-phase alternating-current electric motor as shown in FIGS. 8 and 9, the electric power detection (measurement) accuracy is improved relative to using two current sensors having an electric current measuring range with an upper-limit value of 15 A to measure an electric current value not greater than one-fifth of the measuring range. Alternatively, the electric power value of the three-phase alternating-current electric motor 10 may be calculated from the output result of only the current sensor 28S.

In addition, here the electric current detection accuracy is improved by disposing the current sensors 28S and 28T having different measuring ranges in the electric motor-driven hoisting-lowering device control apparatus (FIG. 8) using the three-phase alternating-current electric motor 10 and in the electric motor-driven hoisting-lowering device control apparatus (FIG. 9) using the single-phase alternating-current electric motor 50, thereby enabling the detection circuit including the control board 20 for detecting electric current and electric power to be compatible with both a three-phase alternating-current electric motor having a small rated current (e.g. 460V) and a single-phase electric motor having a large rated current (e.g. 100V).

Although one embodiment of the present invention has been explained above, the present invention is not limited to the above-described embodiment but can be modified in a variety of ways without departing from the scope of the claims and the technical idea indicated in the specification and the drawings.

For example, although the control board 20 shown in FIGS. 8 and 9 has two current sensor 28S and 28T disposed thereon, the arrangement may be as follows. A current sensor 28R (not shown) having the same electric current measuring range as that of the current sensor 28S, which is suitable for measuring the electric current value of the three-phase alternating-current electric motor 10, may be disposed on the common pattern wiring 22-1 electrically connecting the supply terminal Rt and the non-contact switching devices 21-1 and 21-4 to calculate the electric power of the three-phase alternating-current electric motor 10. With this arrangement, the electric power value can be calculated accurately.

In addition, three current sensors all having different electric current measuring ranges may be disposed as the current sensors 28R, 28S and 28T. By so doing, it is possible to increase the electric power calculation accuracy to a level which cannot be attained with two different measuring ranges and also possible to measure the electric power of an alternating-current electric motor having a different current range.

In addition, the arrangement may also be such that the output voltage of the three-phase alternating-current power supply 100 or the single-phase alternating-current power supply 200 is phase-controlled by non-contact switching devices (21-1 to 21-5) such as triacs (bidirectional thyristors), thereby making it possible to unify types of the three-phase alternating-current electric motor 10 or the single-phase alternating-current electric motor 50 according to the voltage specifications, or to increase the voltage range of the alternating-current power supply applicable to the three-phase alternating-current electric motor 10 or the single-phase alternating-current electric motor 50.

LIST OF REFERENCE SIGNS

10: three-phase alternating-current electric motor
11-1 to 11-3: lead wires
20: control board
21: three-phase non-contact device (solid-state relay SSR)
21-1 to 21-5: non-contact switching devices
22-1 to 22-7: pattern wirings
23: microcomputer
24: control power supply circuit
25: control circuit block
26: full-wave rectification circuit
27: electromagnetic brake
27*a*: exciting coil
28R: current sensor
28S: current sensor
28T: current sensor
30: operation unit
31: emergency pushbutton switch
32: hoisting pushbutton switch
33: lowering pushbutton switch
40: voltage doubler circuit
41: input part
42: single-phase power supply changeover switch
43: single-phase AC-DC converter
44: direct-current circuit
45: output part
50: single-phase alternating-current electric motor (single-phase induction electric motor)
51: main winding
52: auxiliary winding
53: rotor
61: crossover wire (first external wiring)
62: crossover wire (second external wiring)
63: motor start relay
65: phase-advancing capacitor
66-1 to 66-4: lead wires
100: three-phase alternating-current power supply
200: single-phase alternating-current power supply
SP1: single-phase alternating-current power supply terminal
SP2: single-phase alternating-current power supply terminal
Rt: supply terminal
St: supply terminal
Tt: supply terminal
Ut: output terminal
Vt: output terminal
Wt: output terminal

The invention claimed is:

1. An electric motor-driven hoisting-lowering device control apparatus characterized by comprising:

a control board having mounted thereon non-contact switching devices and a microcomputer performing on-off control of the non-contact switching devices, the control board having three supply terminals on an input side thereof and three output terminals on an output side thereof in correspondence to the supply terminals, respectively;

wherein when a three-phase alternating-current electric motor is to be used, a three-phase alternating-current power supply is connected to the supply terminals, and the three-phase alternating-current electric motor is connected to the output terminals, and an alternating current to be supplied to the three-phase alternating-current electric motor is controlled by controlling the non-contact switching devices with the microcomputer;

when a single-phase alternating-current electric motor is to be used, two supply terminals of the three supply terminals of the control board are electrically connected together through a first connecting member to form a single-phase alternating-current power supply terminal to which is connected one terminal of a single-phase alternating-current power supply, and a second connecting member is connected to a remaining supply terminal to form a single-phase alternating-current power supply terminal to which is connected an other terminal of the single-phase alternating-current power supply;

the single-phase alternating-current power supply being connected between the single-phase alternating-current power supply terminals;

a main winding current path being formed so that an alternating current output from one output terminal of the output terminals corresponding to the supply terminals electrically connected together and the output terminal corresponding to the remaining supply terminal passes through a main winding of the single-phase alternating-current electric motor; and an auxiliary winding current path being formed so that an alternating current output from the other output terminal and the second connecting member passes through an auxiliary winding of the single-phase alternating-current electric motor, the alternating currents to be supplied to the main winding and the auxiliary winding being controlled by controlling the non-contact switching devices with the microcomputer.

2. The electric motor-driven hoisting-lowering device control apparatus of claim 1, wherein when the three-phase alternating-current electric motor is used, switching between forward and reverse rotation of the three-phase alternating-current electric motor is performed by interchanging two phases of the three-phase alternating current through on-off control of the non-contact switching devices; and when the single-phase alternating-current electric motor is used, switching between forward and reverse rotation of the single-phase alternating-current electric motor is performed by performing switching such that a phase of a main current flowing through the main winding of the single-phase alternating-current electric motor is reversed 180 degrees when rotation is switched between forward and reverse through on-off control of the non-contact switching devices.

3. The electric motor-driven hoisting-lowering device control apparatus of claim 1, wherein the main winding current path comprises the main winding, an input side of a full-wave rectification circuit, and an operating coil of a motor start relay, which are connected in series, and further comprises an exciting coil of an electromagnetic brake connected to an output side of the full-wave rectification circuit;

the auxiliary winding current path comprising the auxiliary winding, a phase-advancing capacitor, and contacts of the motor start relay, which are connected in series;

wherein the auxiliary winding current path can be on-off controlled by the motor start relay.

4. The electric motor-driven hoisting-lowering device control apparatus of claim 1, wherein the main winding current path comprises the main winding and an input side of a full-wave rectification circuit, which are connected in series, and further comprises an exciting coil of an electromagnetic brake connected to an output side of the full-wave rectification circuit;

the auxiliary winding current path comprising the auxiliary winding and a phase-advancing capacitor, which are connected in series, so that an electric current flowing through the auxiliary winding current path can be cut off by on-off controlling the non-contact switching device with the microcomputer according to a magnitude of electric current flowing through the main winding current path of the single-phase alternating-current electric motor.

5. The electric motor-driven hoisting-lowering device control apparatus of claim 1, wherein two pattern wirings of pattern wirings connected to the supply terminals, respectively, are provided with current sensors having different measuring ranges, respectively.

6. The electric motor-driven hoisting-lowering device control apparatus of claim 1, wherein a pattern wiring for supplying an electric current to the main winding of the single-phase alternating-current electric motor is provided with a current sensor having a large measuring range, and a pattern wiring for supplying an electric current to the auxiliary winding of the single-phase alternating-current electric motor is provided with a current sensor having a small measuring range.

7. The electric motor-driven hoisting-lowering device control apparatus of claim 1, which is provided with a control power supply circuit including a single-phase voltage doubler circuit supplied as an input with an interphase voltage between two phases of the three-phase alternating-current power supply connected to the supply terminals or a single-phase voltage of the single-phase alternating-current power supply connected to the single-phase alternating-current power supply terminals, the single-phase voltage doubler circuit being configured such that when the single-phase voltage is input thereto, the single-phase voltage doubler circuit doubles the input voltage, thereby making the input voltage equal to the interphase voltage between the two phases of the three-phase alternating-current power supply, and thus making a control circuit block including the microcomputer and the control power supply circuit compatible with three-phase and single-phase applications.

* * * * *